US012249297B2

(12) United States Patent
Ramesh et al.

(10) Patent No.: US 12,249,297 B2
(45) Date of Patent: Mar. 11, 2025

(54) DYNAMIC POWER ADJUSTMENT FOR OLED PANELS

(71) Applicant: INTEL CORPORATION, Santa Clara, CA (US)

(72) Inventors: Soorya Ramesh, Bangalore (IN); Priyanka Karwa, Rajasthan (IN); Susanta Bhattacharjee, Bangalore (IN); Geethacharan Rajagopalan, Gold River, CA (US); Arvind S. Tomar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 17/359,218

(22) Filed: Jun. 25, 2021

(65) Prior Publication Data

US 2021/0327395 A1 Oct. 21, 2021

(51) Int. Cl.
*G09G 5/10* (2006.01)
*G09G 3/20* (2006.01)

(52) U.S. Cl.
CPC ............. *G09G 5/10* (2013.01); *G09G 3/2003* (2013.01); *G09G 3/2007* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2009/0274389 A1* | 11/2009 | Yamamoto | H04N 21/4318 | 382/274 |
| 2011/0169852 A1* | 7/2011 | Yu | G09G 3/342 | 345/589 |
| 2012/0019548 A1* | 1/2012 | Zhu | G06T 11/001 | 345/589 |
| 2013/0083970 A1* | 4/2013 | Stephens | G06T 7/254 | 382/165 |
| 2013/0322753 A1* | 12/2013 | Lim | G06T 5/73 | 382/167 |
| 2016/0247460 A1* | 8/2016 | Kim | G09G 3/3413 | |
| 2022/0148520 A1* | 5/2022 | Kim | G09G 3/2003 | |
| 2023/0162334 A1* | 5/2023 | Chiu | H04N 5/202 | 382/274 |

* cited by examiner

*Primary Examiner* — Andre L Matthews
(74) *Attorney, Agent, or Firm* — Banner & Witcoff Ltd.

(57) ABSTRACT

Methods and systems for dynamically adjusting the power consumption of an organic light-emitting diode (OLED) panel are disclosed. In embodiments, a histogram of a frame to be displayed is generated, and a weighted dimming curve is generated, with heavier weighting given to mid-tone intensity pixels. High and low intensity pixels are left only minimally adjusted. The curve is then capped and smoothed to prevent artifacts and to preserve image contrast. Each pixel in the frame is then dimmed according to the curve, and the resultant transformed frame is displayed on the OLED panel.

20 Claims, 6 Drawing Sheets

DYNAMIC POWER ADJUSTMENT FOR OLED PANELS

TECHNICAL FIELD

Disclosed embodiments are directed to power management strategies, and in particular to methods and systems for reducing the power consumption of Organic Light-Emitting Diode (OLED) panels with minimal impact on image quality.

BACKGROUND

OLED panels are increasingly popular options for display technologies, finding use in an array of consumer devices such as monitors, TVs, and commonly, in smartphones, tablets, and similar mobile devices. In contrast to LCD panels that are transmissive, having a white backlight that is typically always on with the panel acting as a filter to form the image, OLED panels are emissive in nature. Each pixel lights up to varying intensities to create an image, with each pixel typically comprised of red, green, and blue subpixels to create a color image. In this sense, OLED panels are more similar to older display technologies such as CRT tubes and plasma displays. Owing to their emissive nature, OLED panels are capable of true blacks and higher contrast than their typical LCD counterparts.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
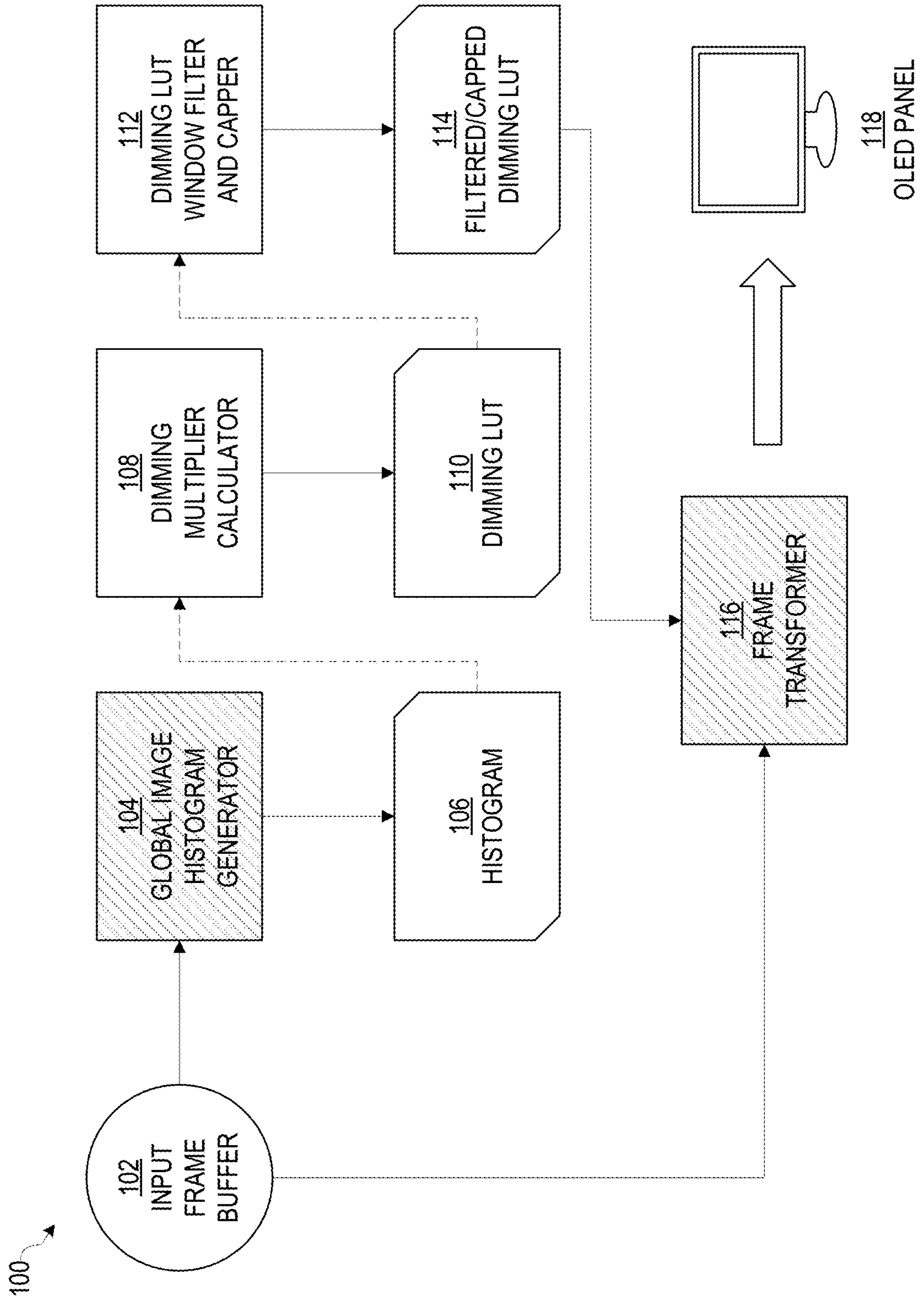
FIG. 1 is an example process flow for dynamically adjusting the power consumption of an OLED panel, according to various embodiments.

OLED screens are increasingly employed on mobile devices, where battery life is a continual consideration. As a general rule, a device with a longer battery life is usually preferable over a device with a shorter battery life, particularly when the two devices are otherwise comparable. The screen of a mobile device is typically one of the biggest consumers of battery power, so approaches that can reduce the power consumption of a mobile device screen can often result in appreciably longer times between device charges. Even for non-mobile devices, e.g. TVs and monitors, power savings are increasingly desirable to achieve energy efficiency targets, with the reduced power usage having a positive environmental impact.

As OLED screens are an emissive technology, they typically consume power to the extent their pixels are lit. The amount of power consumed by a given pixel in an OLED screen may vary depending on brightness, with brighter-lit pixels consuming more power than dimmer pixels. Pixels that are off or black consume little to no power. Thus, the power consumption of an OLED screen can vary depending upon the type and overall brightness of the image displayed on the screen. Low-key and darker images will tend to use less power compared to high-key and brighter images. Various strategies exist to reduce or otherwise moderate power consumption of OLED screens, which typically focus on moderating the brightness of various pixels of the screen to reduce the screen's overall power consumption. For example, some strategies employ selective dimming. This can include edge dimming, where pixels in the edges and corners of the screen, away from where a user's attention is typically focused, are dimmed relative to the screen center. Other selective dimming strategies may employ dynamic detection of the active screen area (such as where a window or box is open on a portion of the screen), and dimming those areas that are inactive. Another dimming strategy may rely on employing an overall dark theme, where the screen predominantly displays darker pixels. A variant of this strategy is to simply dim the screen. Still other strategies may transform the color space of the display based on human eye perception, to reduce the intensity or presence of colors that may be relatively power-hungry.

However, all these known approaches result in visible changes to the display picture quality that many users may find unacceptable. Selected dimming such as edge dimming or inactive screen dimming can result in a vignette effect, with the edges or inactive areas of the screen becoming difficult to read. This may be problematic when the user is attempting to read materials that extend to the screen edges. Transforming the color space may result in undesirable adverse effects to color rendering, confusing of colors, and/or reduction in saturation. While such effects may be acceptable for text, such effects would likely be unacceptable for photo or video viewing. Reduction of contrast similarly impacts rendition of a video or photo by making the picture appear somewhat "muddy". Overall reduction in brightness can have a similar effect as reducing of contrast, as the contrast is defined as the range of intensity spanned between a switched off pixel and a maximum intensity pixel, and can make the screen difficult or even nearly impossible to view in bright ambient light conditions.

Disclosed embodiments include selective dimming of pixels that primarily fall in the mid-tone range of brightness, with pixels at the lower and upper ends of the tonal range comparatively less affected, or unaffected. In a typical display, the number of pixels at or near maximum intensity and at or near minimum intensity is relatively small compared to the number of pixels around the midrange of brightness. By more aggressively dimming mid-tone pixels while leaving high and low intensity pixels either undimmed or only minimally dimmed, a power savings may be realized with only minimal impact to image quality (such as possible color shifts and/or saturation) and contrast range. While the embodiments disclosed herein are described with respect to OLED panels, OLED panels are not intended to be limiting; the principles here could be applied to any suitable emissive display technology where modulation of individual pixel brightness affects power consumption. For example, embodiments employing micro LED technology can realize power savings using the techniques described herein. Other variations will be discussed herein.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example process flow 100 for dynamic power adjustment of an emissive panel, such as an organic light emitting diode (OLED) panel. Process flow 100 may be implemented in hardware, software, or a combination of both. In the embodiment depicted in FIG. 1, global image histogram generator 104 and frame transformer 116 each may be implemented in hardware, in various embodiments, with the remaining blocks implemented in software. In other embodiments, the one or more of the remaining blocks may be implemented in hardware, or with a combination of hardware or software. In a given implementation, the functionality of one or more blocks may be combined, or may be split. Where implemented in hardware, the functionality may be implemented using one or more general purpose processors, dedicated processors, graphics processing units (GPUs), application-specific integrated circuits (ASICs), field-programmable gate arrays (FPGAs), discrete components, or a combination of any of the foregoing. Software implementations may include firmware (such as may run on a general purpose or dedicated processor), software, or a combination of both. Examples of computer systems and software that may provide the functionality of one or more blocks of process flow 100 are discussed herein with respect to FIGS. 6 and 7.

Process flow 100, in embodiments, starts with an input frame buffer 102, which stores a frame to be displayed on an emissive panel, such as OLED panel 118. The frame buffer may store a sequence of one or more frames to be displayed and refreshed on OLED panel 118 at regular intervals. Each frame in frame buffer 102 may be comprised of an array of pixels, arranged to represent a two-dimensional grid that can be displayed on OLED panel 118. The total resolution of each frame is represented by x,y dimensions which may or may not correspond to the native resolution of the OLED panel 118. Where the resolution of each frame corresponds to the native resolution of the OLED panel 118, each pixel can be directly mapped to a corresponding physical pixel on the OLED panel 118. Where the resolution of each frame is less than the native resolution of the OLED panel 118, each pixel may map to multiple physical pixels on the OLED panel 118.

Each pixel in each frame may be comprised of an intensity value that reflects the pixel's brightness. The range of possible intensity values will depend upon the bit size used to express the intensity value. For example, an eight bit intensity value would be capable of 256 possible intensity values, ranging from 0 (pixel is off) to 255 (pixel is fully on), as will be understood. Where the OLED panel 118 is monochrome, each pixel may only need to have a single intensity value. Where the OLED panel 118 displays color, each pixel may have an intensity value represented by an aggregate of red, green, and blue pixel values, with each of the red, green, and blue pixel values representing the intensity of its respective color. The intensity value of each pixel, representing its brightness without regard to color, is the average (or a weighted average) of the red, green, and blue pixel values.

Depending upon the particulars of a given implementation, the input frame buffer 102 may be implemented using a dedicated memory unit, may be part of a graphics card or similar video output circuitry, or may be part of a more general memory unit, such as system RAM or graphics subsystem RAM.

The input frame buffer 102, in embodiments, provides a frame to global image histogram generator 104, which generates a histogram 106. Histogram generator 104 may be implemented in hardware, software, or a combination of both, depending upon the requirements of a given implementation. Global image histogram generator 104 analyzes the current frame in the input frame buffer 102, and creates a histogram representing the intensity levels of the frame stored in the frame buffer 102. The histogram generator 104 generates the histogram by binning the intensity value of each pixel of the frame into a series of bins, with each bin representing one or more proximate set of intensity values. For example, if the intensity values range from 0 (fully off) to 255 (fully on), the histogram generator 104 may bin each pixel into one of 32 bins. Each of the 32 bins is equally spaced, i.e., each bin covers an equal range of pixel intensity values. Using 0-255 as an example, each of the 32 bins would accommodate eight possible intensity values. Bin 1 would accept pixels with intensity values from 0 to 7, bin 2 would accept pixels with intensity values from 8-15, bin 3 would accept pixels with intensity values from 16 to 23, and so forth.

In some embodiments, the bins may not be evenly spaced, but may be logarithmic, i.e. bin 1 would accept pixels with intensity values from 0 to 31, bin 2 would accept pixels with intensity values from 32 to 47, bin 3 would accept pixels with intensity values from 48 to 56, and so forth. Other embodiments may use a different spacing, such as smaller bins to represent mid-range tones (e.g. pixels with intensity values from 96 to 244, or a similar range) that are a particular target for relatively aggressive dimming, and larger bins to represent other tones that are not targets for aggressive binning. Such varying spacing of bins could allow for more fine-grained tuning of mid-tone pixel dimming. In still other embodiments, more or fewer bins than 32 may be employed, depending on the needs of a given implementation. The number of possible bins may also be increased or decreased, and/or the size of each bin varied, depending on the number of possible intensity levels. Implementations that may provide 16 bits of intensity (65,536 levels), for example, may employ more bins that may accommodate a larger range.

As mentioned above, the intensity level for each pixel, where each pixel has color channels, may be computed by averaging the intensity of each red, green, and blue channel. Depending upon the specifics of a given implementation, each color channel may be averaged equally (straight average), or one or more channels may be weighted heavier than the others (weighted average), to result in a weighted histogram 106. The selection of a straight or weighted average can depend upon how a specific OLED panel 118 is implemented. The red, green, and blue channels may map to separate sub-pixel elements in the OLED panel 118. Where each of the sub-pixel elements consumes roughly the same amount of power for a given intensity level, a straight average may be employed. Where one or more of the sub-pixel elements consumes a differing amount of power from the others for a given intensity level, a weighted average may be employed to compensate for the differing power consumption. It should be appreciated that other factors may intervene, such as whether the response of a given pixel to adjustments in intensity value may alter the perceived color of the given pixel, or if a weighted average may result in rendering a disproportionately darker or lighter hue compared to the overall balance of the image represented by the frame. Selection of a straight or weighted average, and if weighted, the extent of weighting and affected channels, may be made with respect to the specifics of a given OLED panel 118, intended use of the OLED panel 118 (pictures and video vs. text), desired level of dimming/power savings, and/or any other requirements of a given implementation.

Following calculation of the histogram 106, in embodiments, the histogram 106 is provided to a dimming multiplier calculator 108. Dimming multiplier calculator 108 may be implemented in hardware, software, or a combination of both. In some embodiments, the dimming multiplier calculator 108 may be part of the global image histogram generator 104. In the depicted embodiment, the dimming multiplier calculator 108 computes a dimming curve (expressed as a dimming look-up table (LUT) 110) in response to analyzing the histogram, and determining where the bulk of the pixel intensity values lie. The dimming multiplier calculator 108 may also accept as input various data points, such as the desired aggressiveness of dimming and/or a weighted dimming curve, which equates to a desired level of power savings, and/or a predetermined threshold or thresholds above or below which the dimming multiplier calculator 108 will decrease or end dimming. The desired aggressiveness of dimming may be supplied by the user of the OLED panel (or an associated device), either directly or indirectly, such as part of an overall system-wide power management scheme. Such predetermined thresholds may establish the lower and/or upper range of the mid-tone intensity values that are the target for dimming, while pixels beyond the thresholds will be either increasingly too dark or increasingly too light to aggressively dim without either crushing the low tones of the frame to black or unacceptably reducing contrast. The curves and calculations employed to generate the dimming LUT 110 will be discussed in greater detail below with respect to FIGS. 2 and 3.

The resulting dimming curve, as mentioned above, is expressed as or computed to a dimming LUT 110, in embodiments. Expressing the dimming curve as a look-up table, as will be understood, allows for quickly and efficiently determining the amount a given pixel intensity value should be reduced to conform to the calculated dimming curve, without the need to execute an algorithmic analysis on each pixel. The LUT can be used in hardware, such as frame transformer 116 (discussed below) to readily transform a frame in the input frame buffer 102 into a dimmed frame that reduces power consumption of the OLED panel 118.

Following computation of the dimming curve/dimming LUT 110, the dimming curve/LUT 110 is provided to dimming LUT window filter and capper 112. As with dimming multiplier calculator 108, the dimming LUT window filter and capper 112 may be implemented in hardware and/or software, and in some embodiments may be a part of global image histogram generator 104. The dimming LUT window filter and capper 112 modifies and filters the dimming curve/LUT 110 to help preserve the contrast ratio of the frame, by reducing or eliminating dimming for pixels with intensity values greater than a predetermined threshold. The predetermined threshold may vary depending upon the desired level of dimming aggressiveness.

Furthermore, because the dimming LUT 110 is generated in response to the histogram 106, where the histogram 106 has peaks (such as due to a substantial number of pixels being binned into a single bin), the resulting dimming LUT 110 may have corresponding peaks reflecting the histogram peak(s). This phenomenon results because the binning of pixel intensity values effectively results in a range of pixels, defined by the bin size (discussed above), potentially being more aggressively dimmed compared to neighboring bins that may have substantially fewer pixels. Where the spike in one bin is biased towards the bin's border (e.g. most pixels in a bin from 192-199 have intensity values of 198 or 199), this can result in dimming creating artifacts, e.g. banding, due to pixels near the border of the adjacent, lower bin not being as aggressively dimmed. By applying a windowed smoothening or smoothing filter, these peaks in the dimming curve are softened and blended into the surrounding curve, so that any banding or other artifacts resulting from the binning are diminished, if not outright eliminated. It should be understood that in embodiments where the histogram employs a greater number of relatively narrow bins (even down to a single pixel intensity value per bin), employing a smoothing filter may be less critical. Examples of suitable smoothing filters can include a moving window finite impulse response (FIR) low pass filter, which can provide a weighted average of neighboring values; in this case, the neighboring values are those of the dimming LUT 110. Three tap weighted filters may be employed, with weights such as [0.25, 0.5, 0.25]. To handle boundaries where there are insufficient neighbors, samples around the boundaries can be mirrored. The algorithms used for smoothing and the resulting curves will be discussed in greater detail below, with respect to FIGS. 4A and 4B.

Following processing by dimming LUT window filter and capper 112, the resulting filtered and capped dimming LUT 114 is provided to frame transformer 116, in embodiments. Frame transformer 116 processes each of the pixels of the frame from input frame buffer 102 by referencing the filtered and capped dimming LUT 114 to determine the amount by which each pixel should be dimmed. The frame transformer 116 then adjusts the intensity value of each pixel (which may be the average of the red, green, and blue channel values) down per the amount obtained from the LUT 114. In embodiments where red, green, and blue channel values are adjusted, they may be adjusted roughly equally so as to only result in a decrease in brightness, but without a shift in hue and/or chroma, and a tolerable saturation shift. Depending upon the nature of the OLED panel 118 in a given implementation, in some embodiments the relative dimming of the red, green, and blue channels may be weighted to account for different responses to dimming to ensure there is no shift in hue or chroma.

Frame transformer 116 is implemented in hardware in some embodiments, such as part of a graphics subsystem. In other embodiments, frame transformer 116 may be implemented in software on a graphics subsystem, such as by a GPU, as software that runs on a CPU, or with a combination of hardware and software. The result from frame transformer 116 is a dimmed frame, which may then be provided to OLED panel 118 for display. The dimmed frame may be provided to a frame buffer that feeds the OLED panel 118.

It should be recognized that the approach provided by process flow 100 results in a consistent and uniform application across all pixels within the input frame buffer 102, so that no portion of the screen is overly dimmed compared to others, and a user can expect consistent viewing from edge to edge of the OLED panel 118. Users can realize power savings without the need to employ dark themes which some users may find undesirable. Furthermore, because the process flow 100 works on pixel intensity values obtained from averaging the red, green, and blue channels, it is color-agnostic; power savings can be realized regardless of which shade of color predominates the screen. For example, a screen displaying a predominately blue tint may have comparably low contrast, rendering contrast-based adjustments less effective at power savings. Because the described embodiments are color-agnostic and work primarily on mid-range tones, appreciable power savings can be realized even on lower contrast blue displays.

Furthermore, as discussed above OLED panel 118 is one possible embodiment. Process flow 100 may be employed with any other type of emissive display technology where modulation of individual pixel intensity values can result in power savings, such as micro LEDs. The amount of power savings realized and shape of the curves (described below) used to compute the per-pixel intensity adjustments may vary depending upon the type of emissive display technology, and the particulars of a given display, e.g. monochrome vs. color, number of pixel color types, display size, screen resolution, etc. Still further, while the disclosed embodiments are described with respect to a color panel that utilizes red, green, and blue subpixels to render color, the techniques used in the disclosed embodiments could be employed with panels that use different sets of color channels and/or subpixels (such as a cyan/magenta/yellow system), including fewer or greater numbers of channels (such as a display that could employ red, green, blue, cyan, magenta, and yellow, to achieve an enhanced color space, or a monochrome display). Still further, the techniques of the disclosed embodiments could be applied to displays that use emissive technology for the backlight, but may employ a transmissive filter to provide color. For example, some LED-backlit transmissive LCD displays use a panel of individual monochrome LEDs for each individual pixel, with each LED filtered to create color. Where the intensity value (brightness) of each individual LED can be separately controlled, the techniques of the disclosed embodiments could be applied to provide power savings, with the backlight comprising the emissive portion of the display. Still further, it will be understood by a person skilled in the art that, where a monochrome panel is used for the display, the frame buffer may be able to express pixels as a single channel of luminance, without the need for separate red, green, and blue channels. In such an implementation, there would be no averaging of channels needed.

Figure 2:
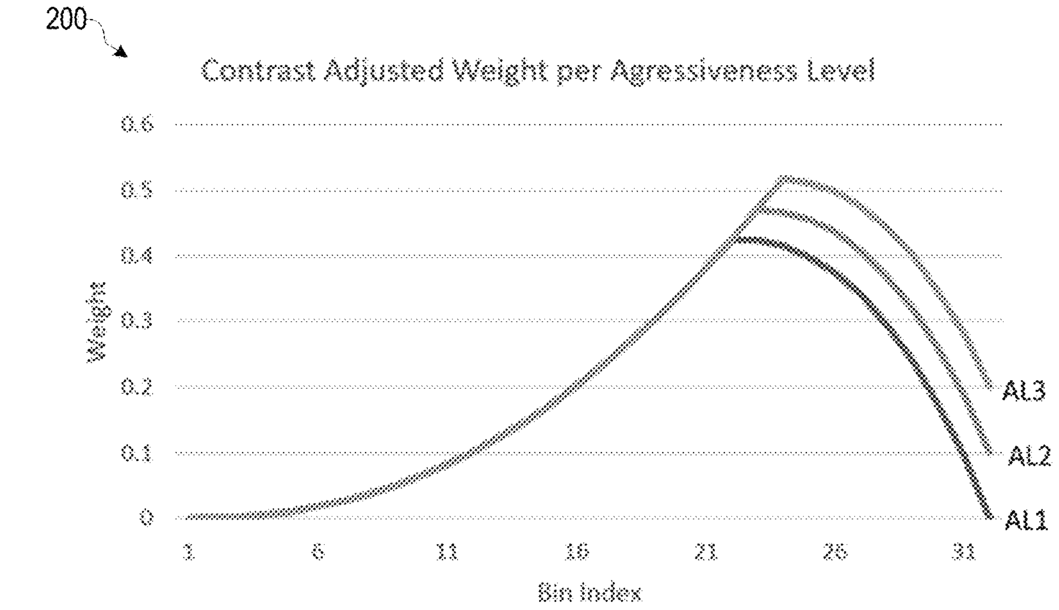
FIG. 2 depicts several weight curves that can be used to dynamically adjust the power consumption of an OLED panel, according to various embodiments.

FIG. 2 illustrates several example curves 200 that may be employed in computing a dimming target for a frame, such as by dimming multiplier calculator 108 (FIG. 1). In the example curves 200, each curve is illustrated as the relationship of a dimming weight over 32 bins, to correspond to an example 32-bin histogram. The example curves 200 illustrate the weighting applied to compute a dimming LUT or curve, such as dimming LUT 110 (FIG. 1), where the weighting focuses aggressive power reduction on pixels with mid-tone intensity values, while reducing aggressiveness on low-tone and high-tone pixels. Three different example curves are illustrated, labeled AL1, AL2, and AL3. Each curve corresponds to a different aggressiveness level, with AL1 being low, the least aggressive curve, and AL3 being high, the most aggressive. The selection of which weighted curve to apply may be made based on system preferences, as part of a system-wide power management strategy, or directly or indirectly by a user of a device implementing process flow 100.

Each curve 200 is roughly shaped like a shark fin. As the intensity adjustment weight of each example curve rises, indicated on the y-axis, pixels found in the corresponding bin, indicated on the x-axis, are given increasingly greater weight in the resulting dimming curve, e.g. the presence of a given number of pixels results in a greater dimming factor where the pixels are in bin index 23 as compared to the same number of pixels in bin index 9. As can be seen, mid-tone pixel intensity values (from roughly bin index 11 to bin index 26 in the depicted example curves) are given greater weight and so result in a greater dimming factor, with a bias towards brighter midtones that consume more power. Peak aggressiveness is found near the brighter mid-tone levels, between bin indexes 21 and 26 in the depicted example, depending upon the curve that corresponds to the selected aggressiveness level. After the curve peak, brighter pixel intensity values are weighted at a diminishing rate until the top bin, to help preserve image contrast. Although the brighter pixels consume the most power, in a typical image the number of brighter pixels also drops off as the histogram bins increase.

Conversely, to the left of the peak the example weight curve sags in a non-linear fashion, flattening as the bin index reaches zero. Due to the nature of the typical color space of an OLED display, e.g. an sRGB color space, intensity values tend to be non-linear as they lower in value. The sag of the weight curve effectively linearizes non-linear pixel values. The sag of the weight curve may be adjusted depending upon the color space used for the OLED display, such as in reflection to different types of gamma curves utilized by a given color space.

The point of the peak may be selected or predetermined with respect to a selected aggressiveness level, with more aggressive dimming targets resulting in a shift of the peak rightward (with reference to the curves 200 in FIG. 2) into brighter mid-tone pixels, thereby increasing the power savings from dimming. It will be appreciated that, in the example curves 200 of FIG. 2, each of curves AL1, AL2, and AL3 follow a substantially identical sag to the left of their peak, and a similar descending profile to the right of the peak. The primary difference is the position at which the ascending curve peaks and transitions into the descending curve for higher pixel intensity values. Thus, in the depicted embodiment, the aggressiveness is defined by both the maximum weight at the curve peak, as well as the bin index of the peak, with more aggressive dimming targets having both a greater maximum weight and higher bin index at peak. It should also be appreciated that more aggressive dimming targets also dim pixels with a brighter intensity value, i.e. to the right of the peak, more aggressively, due to the descending curve having an identical profile across AL1, AL2, and AL3, but starting from a higher peak. Thus, the brightest pixels may not be dimmed when AL1 is selected, as the AL1 curve descends to a zero weight, so that even a substantial number of pixels in bins 31 and 32 will have little impact on the resulting dimming curve. In contrast, the brightest pixels may be dimmed somewhat for the AL2 and AL3 curves, which end at a 0.1 or 0.2 weight, respectively. In other words, when curves AL2 or AL3 are selected, in the depicted embodiment, pixels in the highest bins may be given greater weight for the resulting dimming curve.

The dimming curve or LUT, such as dimming LUT 110, is computed using the following functions, according to embodiments:

$$\text{Weighted Power }(I_n)=\text{ContrastBinWeight}(I_n)*\text{Histogram}(\text{AverageRGB}(I_n)) \quad (1)$$

This results in a power distribution curve based on the contrast bin weight, as seen in FIG. 2. Next, the power distribution curve is normalized into a [0,1] range as follows:

$$\text{Normalized Power}(I_n)=\text{Weighted Power}(I_n)/\text{Max}(\text{Weighted Power}) \quad (2)$$

The inverse of the normalized power is then obtained:

$$\text{Inverse Power}(I_n)=1-\text{Normalized Power}(I_n) \quad (3)$$

Finally, the dimming curve (which may be expressed as a dimming LUT using any suitable known method), which is the dimming factor to be applied to pixels in each histogram bin and expressed as a curve, is calculated:

$$\text{Dimming Factor}(I_n)=\text{Dimming Target}+(1-\text{Dimming Target})*(\text{Inverse Power}(I_n)-\text{Average}(\text{Inverse Power})) \quad (4)$$

In each function, $I_n$ is the histogram bin index. Where no bin index is provided, the function takes all values of the respective variable as a whole, across all bins. The dimming target, in embodiments, is a fixed or predetermined value that corresponds to the selected aggressiveness level. For example, a low aggressiveness level may have a dimming target of 0.9, or 90% of the original intensity value (i.e. the pixel intensities across the entire frame averages to a 10% reduction in intensity); a medium aggressiveness level may have a dimming target of 0.8, or 80% of original intensity value (i.e. average reduction in intensity across the frame is 20%); and a high aggressiveness level may have a dimming target of 0.7, or 70% of original intensity value (i.e. average reduction in intensity across the frame is 30%). The dimming curve thus is calculated to achieve the selected dimming target when the dimming of all pixels in the frame is averaged, with the curve centered at zero. As will be understood, midtone pixel intensity values will be more aggressively dimmed past the dimming target, while low and high tone pixel intensity values will be less aggressively dimmed, so that the average achieves the selected dimming target.

Figure 3:
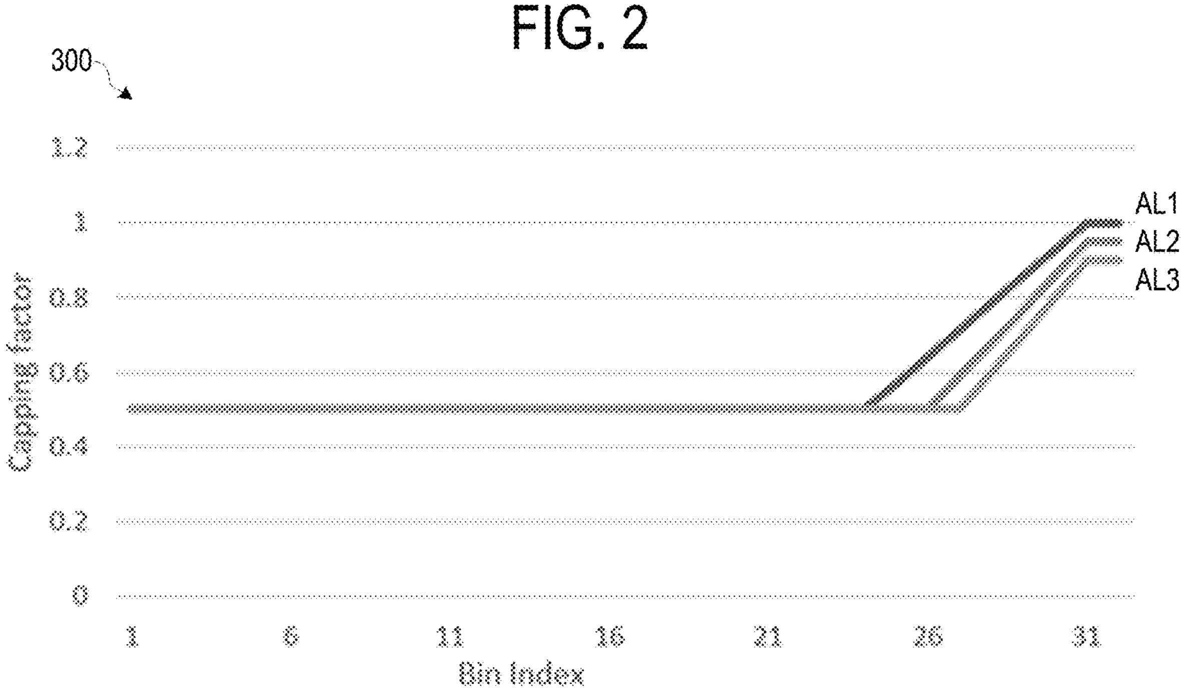
FIG. 3 depicts several filtering curves that can be used to help preserve image contrast when dynamically adjusting the power consumption of an OLED panel, according to various embodiments.

FIG. 3 illustrates a set of example curves 300 that may be employed for capping the dimming curve, such as dimming LUT 110, by a filter or capper, such as dimming LUT window filter and capper 112. As with the curves in FIG. 2, three capping curves are depicted in FIG. 3, labeled AL1, AL2, and AL3. These curves 300 correspond to the three aggressiveness levels, low, medium, and high, respectively. The dimming curve is processed with the appropriate capping curve that corresponds to the selected aggressiveness level, and thereby acts to ensure that bright pixels, starting at the top of the mid-tone range, are not overly dimmed, particularly when a high-key image, with a significant number of bright pixels, is processed. Each example curve 300 is depicted as the relationship between a bin index, shown on the x-axis, relative to a capping factor, shown on the y-axis.

The dimming curve is processed against the appropriate capping curve according to the following function:

$$\text{Dimming Factor}(I_n)=\text{Max}(\text{Dimming Factor}(I_n),\text{Capping Factor}(I_n)) \quad (5)$$

As with functions 1-4, above, $I_n$ is the histogram bin index. The dimming factor is the point on the dimming curve, e.g. dimming LUT 110, that corresponds to a given histogram bin index. The dimming factor, expressed between 0 and 1, is essentially a percentage of maximum intensity value that is applied to each pixel, operating the same as the dimming target described above. Thus, a dimming factor of 0.8 means that a corresponding pixel will have its intensity value reduced to 80%, i.e., a 20% reduction in luminance. The greater the dimming factor, the brighter the final intensity value. As will be understood, in the function the capping factor acts as a floor for the dimming factor, as the greater of the two values is selected. For example, pixels in bin index 31 have a varying potential dimming weight depending on the selected curve 200 (see FIG. 2), but a cap of 1.0 for any of the AL1, AL2, or AL3 curves in curve 300. Even if a sufficient number of pixels are found in bin 31 to result in an appreciable dimming factor, the cap of 1.0 (100% pixel intensity value) will nevertheless intervene to prevent any dimming. Similarly, in each of the three example curves 300, there is a minimum cap of 0.5. Thus, the maximum dimming factor that will ever be applied to a pixel intensity value is 50% when one of the example curves 300 is utilized.

As mentioned above, in embodiments the dimming LUT window filter and capper 112 also engages in smoothing of the dimming curve, such as dimming LUT 110, following processing with the capping curve 300. Processing may be done using a multi-tap filter, such as a three tap filter. An example function to implement a three tap smoothening filter is:

$$\text{Filtered Dimming Factor}(I_n)=(0.25*\text{Dimming Factor}(I_{n-1}))+(0.5*\text{Dimming Factor}(I_n))+(0.25*\text{Dimming Factor}(I_{n+1})) \quad (6)$$

$I_n$ is the histogram bin index, as with functions 1-5, above. The window is defined by the bin index taps of $I_{n-1}$, $I_n$, and $I_{n+1}$. Where $I_n$ is a boundary, e.g. $I_1$ or $I_{32}$, the corresponding lower or upper tap is simply mirrored, e.g. $I_1$ will utilize $I_2$ for both the surrounding taps; similarly, $I_{32}$ will utilize $I_{31}$ for both the surrounding taps. Functions that include more taps may be employed, e.g. 5, 7, or more taps, depending on the desired smoothing and the specifics of a given implementation.

Figure 4A:
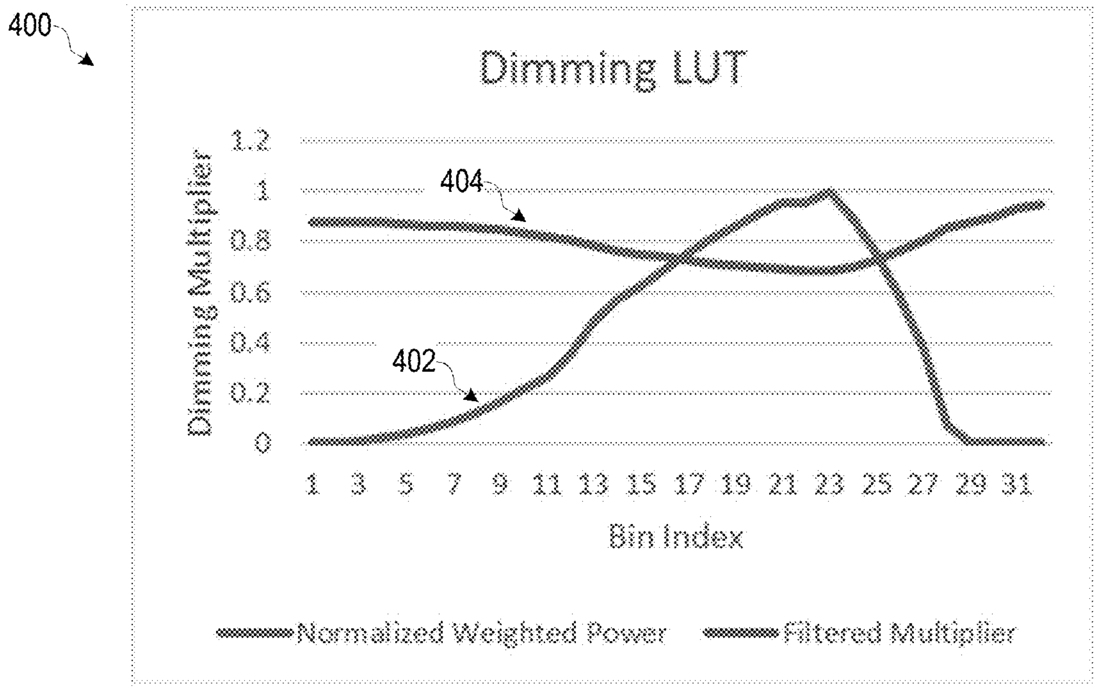
FIGS. 4A and 4B depict two different dimming look-up tables (LUTs), generated from a weight curve, to dynamically adjust the power consumption of an OLED panel, according to various embodiments.
Figure 4B:
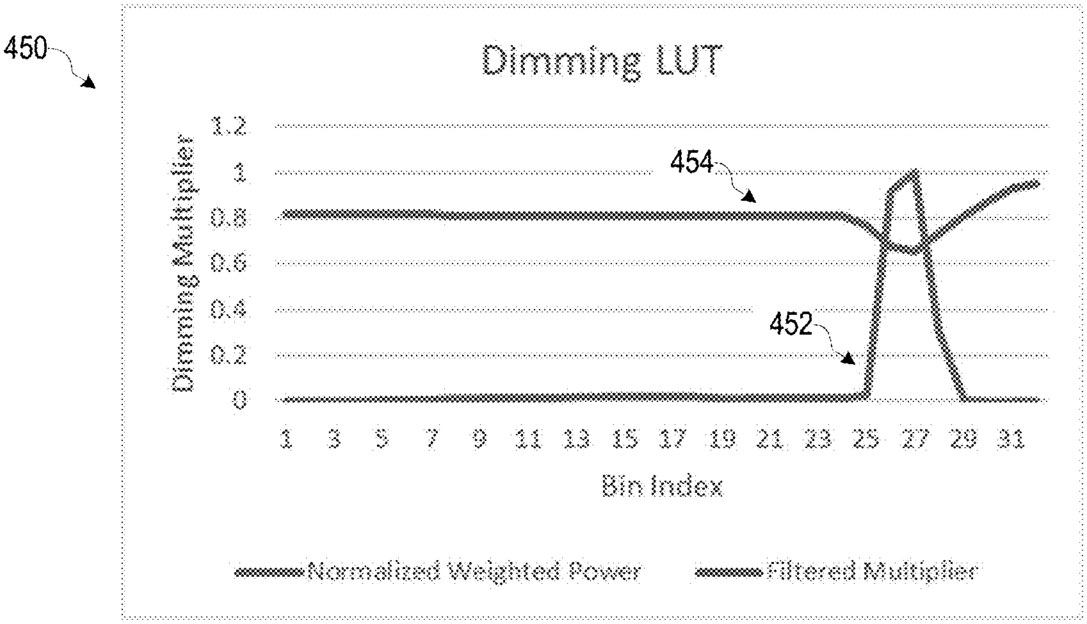

FIGS. 4A and B illustrate two possible example dimming curves that are the result of process flow 100, and processing with functions 1-6 discussed above. FIG. 4A illustrates dimming LUT 400, and FIG. 4B illustrates dimming LUT 450. In each example LUT 400, 450, two curves are shown: a normalized weighted power histogram 402, 452, and the resulting filtered dimming factor or multiplier 404, 454. Histograms 402 and 452 illustrate the resulting histograms such as from histogram generator 104. The higher the curve point, the greater the power consumption of the pixels in the corresponding bin index. Thus, for example histogram 402, pixels around bin indices 21-23, peaking at bin index 23, are expected to consume the greatest amount of power. Dimming factor curve 404 shows a corresponding trough with a minimum around bin indices 21-23. A frame processed with the dimming factor curve 404 would reduce the pixel intensity values for bin indices 21-23 by approximately 0.7, or 70% of their original intensity value.

For histogram 452 of curve 450, in FIG. 4B, pixel intensity values are clustered almost entirely between bin indices 25 and 29, with a peak around bin index 27. Dimming factor curve 454 shows a corresponding valley that is likewise centered around bin index 27. However, due to smoothening and capping, the dimming factor curve has a gentler dip that avoids the steep peaks from histogram 452. Furthermore, even though histogram 452 returns to zero after bin index 452, indicating few or no pixels with corresponding high intensity values, the dimming factor curve 454 rises above its baseline of 0.8 to approach 1.0 near its extreme right end. This upward inflection is the result of the capping curve, such as described above with respect to curves 300 (FIG. 3), where the dimming factor is selected as the greater of the dimming factor curve and the capping curve. As can be seen in FIG. 3, each capping curve rises to 1.0 at its extreme right end, and thereby prevents the brightest pixels from being subject to any dimming.

Figure 5:
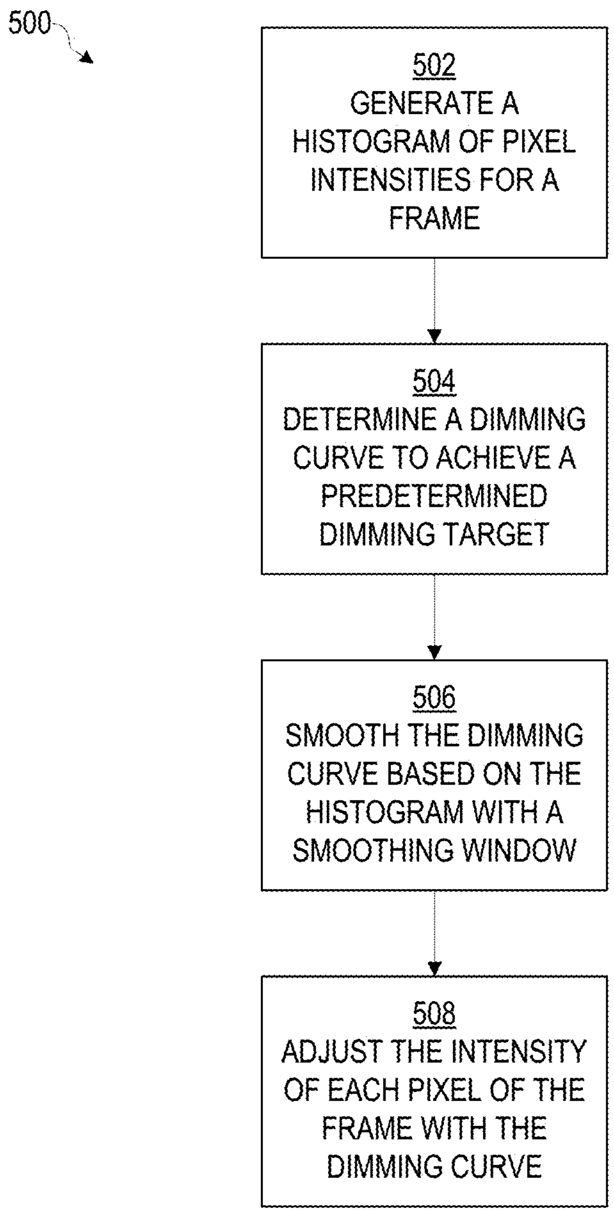
FIG. 5 is a method for dynamically adjusting the power consumption of an OLED panel, according to various embodiments.

FIG. 5 is a flowchart of the operations of an example method 500 for dynamic power adjustment for an OLED panel, according to various embodiments. Method 500 may be carried out by an apparatus that manages or drives an OLED panel, such as part of process flow 100, by one or more of the components of process flow 100. The operations of method 500 may be carried out in whole or in part, simultaneously or serially, in different orders than depicted in method 500, and depending on the embodiment, one or more operations may be omitted or additional operations may be added.

In operation 502, a histogram of pixel intensities is generated for a frame, such as by global image histogram generator 104. The frame may be provided from a frame buffer, such as input frame buffer 102. The resulting histogram is then passed to operation 504, where a dimming curve or dimming LUT, such as dimming LUT 110, is determined to achieve a predetermined diming target. Operation 504 may be carried out by, for example, dimming multiplier calculator 108, which may execute one or more of functions (1)-(4), described above with respect to FIG. 2.

The resulting dimming curve or LUT is then smoothed, in operation 506, based on the histogram from operation 502, employing a smoothing window, such as a multi-tap windowed smoothening function. Additionally, smoothing may also including capping the curve to limit or prevent dimming of brighter pixel intensity values, to preserve image contrast range. Capping may alternatively be performed as part of operation 504, depending on the needs of a given embodiment. Capping may include processing with a capping curve, such as capping curve 300, and function (5), described above with respect to FIG. 3. Smoothing may include applying a multi-tap filter such as function (6), also described above with respect to FIG. 3. A filtered dimming factor curve, such as example curves 404 or 454, may result from operation 506. Operation 504 may be carried out, in embodiments, by a dimming multiplier calculator, such as dimming multiplier calculator 108, and/or a dimming LUT window filter and capper, such as filter and capper 112.

In operation 508, the filtered dimming factor curve, such as example curve 404 or 454, is used to adjust the intensity of each pixel in the original frame. This process may be carried out with a frame transformer, such as frame transformer 116, which may be implemented in hardware to ensure rapid processing. The result of the frame transformer is a frame with pixels that have been dimmed to achieve a target power savings goal, which can then be passed to an OLED panel, such as OLED panel 118, for display.

It should be understood that the various operations of method 500 detailed above may be carried out iteratively, on each successive frame to be displayed on the OLED display. The rate at which method 500 iterates may correspond to the frame rate or refresh rate of the OLED display. For example, if the OLED display has a 60 Hz refresh rate, method 500 is carried out 60 times per second, to dynamically adjust the power consumption by selectively dimming each successive frame. The result, then, is a video stream provided to the OLED display that reduces the power consumption of the OLED display, but with minimal degradation to contrast and color, such that the transformed video is not modified in a noticeable fashion.

Figure 6:
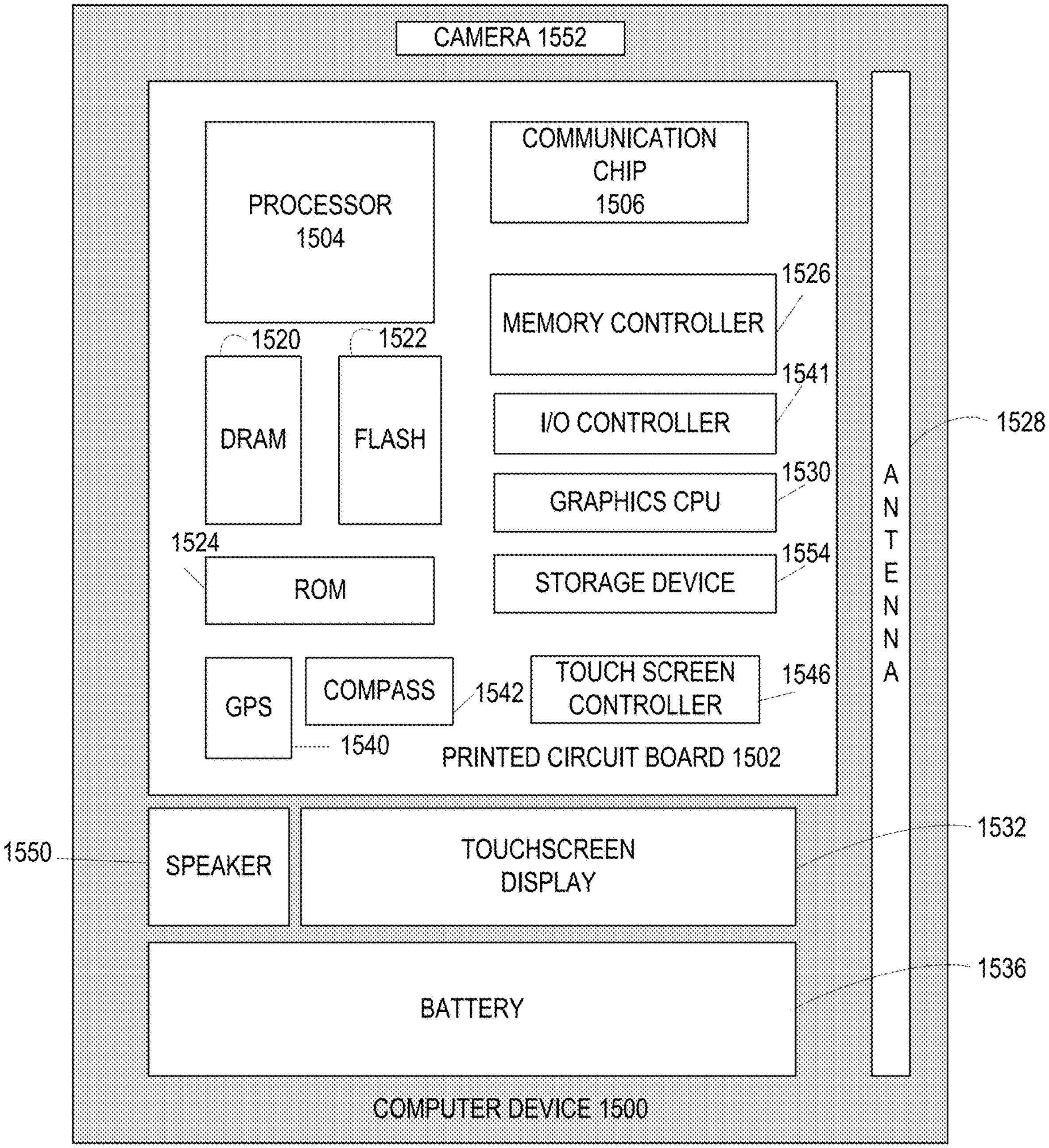
FIG. 6 is a block diagram of an example computer that can be used to implement some or all of the components of the system of FIG. 1, according to various embodiments.

FIG. 6 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, the one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of the system 100, process flow 200, and/or method 300, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

Figure 7:
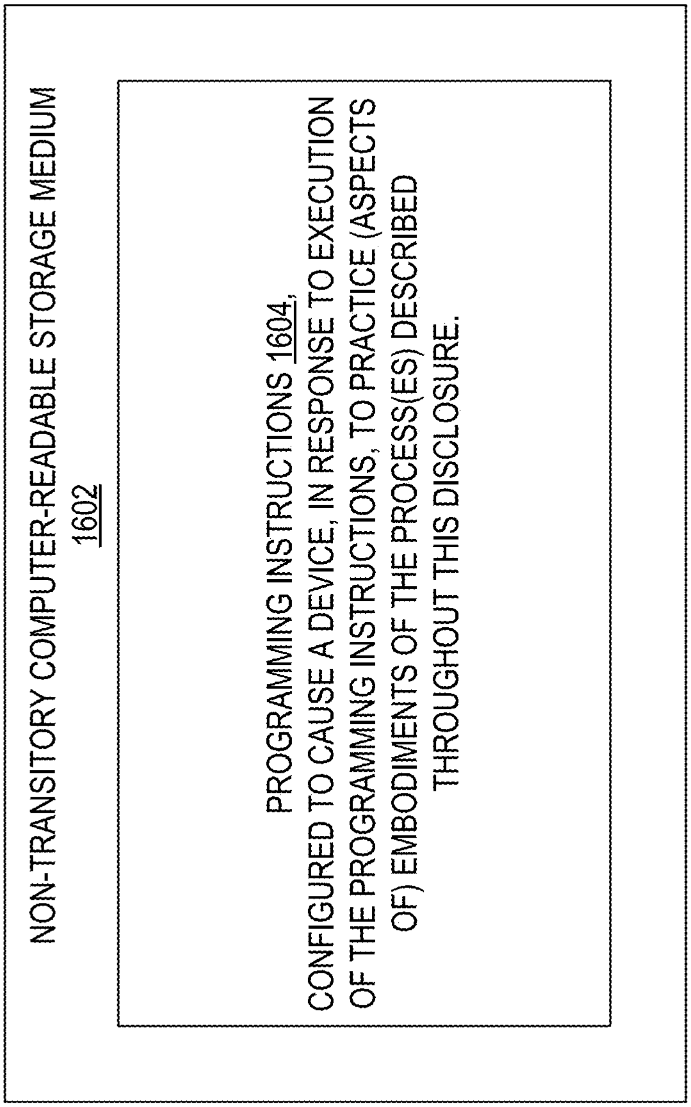
FIG. 7 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) system 100, process flow 200, and/or method 300. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

EXAMPLES

The following examples pertain to further embodiments:

Example 1 includes a method for dynamically adjusting the power consumption of an OLED screen, comprising generating, for a frame comprised of a plurality of pixels, a histogram of a distribution of intensity for the plurality of pixels; determining, from the histogram, a dimming curve that preserves image contrast ratio while achieving a predetermined dimming target; smoothing, using the histogram, the dimming curve; and adjusting, using the dimming curve, the intensity of each of the plurality of pixels in the frame.

Example 2 includes the subject matter of example 1, further comprising determining the intensity of each pixel by averaging red, green, and blue channel values of each pixel.

Example 3 includes the subject matter of example 1 or 2, wherein generating the histogram comprises binning the intensity for each pixel into one of a plurality of bins, each of the plurality of bins representing a range of intensity values that is a subset of total possible intensity values.

Example 4 includes the subject matter of example 3, wherein determining the dimming curve comprises determining a curve that dims the pixels in bins that represent mid-tones at a first weight, and dims pixels in bins beyond a predetermined threshold with a linearly decreasing weight.

Example 5 includes the subject matter of example 3 or 4, wherein each range of intensity values for each of the plurality of bins is equal in size.

Example 6 includes the subject matter of any of examples 2-5, further comprising weighting the averaging to reflect relative power consumptions of red, green, and blue channels.

Example 7 includes the subject matter of any of examples 1-6, wherein determining the dimming curve comprises determining a curve that dims pixels with intensities that represent mid-tones in the frame greater than pixels with intensities that represent either low tones or high tones.

Example 8 includes the subject matter of any of examples 1-7, wherein smoothing the dimming curve comprises passing the dimming curve through a windowed smoothing filter.

Example 9 includes a non-transitory computer-readable medium (CRM) comprising instructions that, when executed by an apparatus, cause the apparatus to generate, for a frame comprised of a plurality of pixels, a histogram of a distribution of intensity for the plurality of pixels, each of the plurality of pixels having an intensity determined by an average of red, green, and blue channel values for the pixel; determine, from the histogram, a dimming curve to achieve a predetermined dimming target; smooth, using the histogram, the dimming curve; and adjust, using the dimming curve, the intensity of each of the plurality of pixels in the frame.

Example 10 includes the subject matter of example 9, wherein the instructions are to further cause the apparatus to bin the intensity for each pixel into one of a plurality of bins, each of the plurality of bins representing a range of intensity values that is a subset of total possible intensity values.

Example 11 includes the subject matter of example 10, wherein the instructions are to further cause the apparatus to determine a curve that dims the pixels in bins that represent mid-tones at a first weight, and dims pixels in bins beyond a predetermined threshold with a linearly decreasing weight.

Example 12 includes the subject matter of example 10 or 11, wherein each range of intensity values for each of the plurality of bins is equal in size.

Example 13 includes the subject matter of any of examples 9-12, wherein the instructions are to further cause the apparatus to weight the average to reflect relative power consumptions of red, green, and blue channels.

Example 14 includes the subject matter of any of examples 9-13, wherein the instructions are to further cause the apparatus to determine a dimming curve that dims pixels with intensities that represent mid-tones in the frame greater than pixels with intensities that represent either low tones or high tones.

Example 15 includes the subject matter of any of examples 9-14, wherein the instructions are to further cause the apparatus to pass the dimming curve through a windowed smoothing filter.

Example 16 includes the subject matter of any of examples 9-15, wherein the instructions are to further cause the apparatus to implement the dimming curve as a look-up table.

Example 17 includes an apparatus, comprising a histogram generator adapted to place each pixel of a plurality of pixels of a frame into a one of a plurality of bins based upon each pixel's intensity value, each of the plurality of bins representing a range of intensity values that is a subset of all possible intensity values; a multiplier calculator adapted to determine a dimming curve, the dimming curve weighted to more heavily dim pixels in bins that represent mid tones of the frame over pixels in bins that represent dark tones or light tones of the frame; a window filter adapted to smooth the dimming curve; and a frame transformer to adjust the intensity value of each pixel of the frame based on the smoothed dimming curve.

Example 18 includes the subject matter of example 17, wherein each pixel's intensity value is an average of red, green, and blue channel values for the pixel.

Example 19 includes the subject matter of example 17 or 18, wherein each of the plurality of bins is of equal size.

Example 20 includes the subject matter of any of examples 17-19, wherein the dimming curve is represented as a look-up table.

Example 21 includes the subject matter of any of examples 1-8, further comprising capping the dimming curve by imposing a maximum amount by which the intensity of each pixel may be dimmed.

Example 22 includes the subject matter of example 21, wherein imposing the maximum amount by which the intensity of each pixel may be dimmed comprises comparing the dimming curve against a capping curve, and selecting the maximum of either the dimming curve or capping curve for each point along the dimming curve.

What is claimed is:

1. A method, comprising:

determining, for a frame comprising a plurality of pixels, an intensity of each one of the plurality of pixels by averaging subpixel channel values of each pixel of the plurality of pixels;

generating a histogram of a distribution of the intensity of the plurality of pixels by binning the intensity for each pixel of the plurality of pixels into one of a plurality of bins, each of the plurality of bins representing a range of intensity values that is a subset of total possible intensity values, such that the histogram is based upon the average of the subpixel channel values per pixel;

determining, from the histogram, a dimming curve that preserves image contrast ratio while achieving a predetermined dimming target;

smoothing, using the histogram, the dimming curve; and adjusting, using the dimming curve, the intensity of each of the plurality of pixels in the frame, wherein each range of intensity values for each of the plurality of bins is equal in size.

2. The method of claim 1, wherein the subpixel values of each pixel of the plurality of pixels comprise red, green, and blue channel values corresponding to red, green, and blue channels, respectively.

3. The method of claim 1, wherein determining the dimming curve comprises determining a curve that dims the pixels in bins that represent mid-tones at a first weight, and dims pixels in bins exceeding a predetermined threshold with a linearly decreasing weight.

4. The method of claim 2, further comprising:

weighting the averaging to reflect relative power consumptions of the red, green, and blue channels.

5. The method of claim 1, wherein determining the dimming curve comprises determining a curve that dims pixels with intensities that represent mid-tones in the frame greater than pixels with intensities that represent low tones or high tones.

6. The method of claim 1, wherein smoothing the dimming curve comprises passing the dimming curve through a windowed smoothing filter.

7. The method of claim 1, further comprising:

capping the dimming curve by imposing a predetermined threshold amount by which the intensity of each pixel of the plurality of pixels may be dimmed.

8. The method of claim 7, wherein imposing the predetermined threshold amount by which the intensity of each pixel of the plurality of pixels may be dimmed comprises comparing the dimming curve against a capping curve, and selecting a greater of the dimming amount resulting from the dimming curve or the dimming amount resulting from the capping curve for each point along the dimming curve.

9. The method of claim 1, wherein each pixel of the plurality of pixels is emissive, and wherein the subpixels of each of the plurality of pixels are used for color rendering in accordance with a color panel.

10. The method of claim 1, wherein the plurality of pixels of the frame correspond to an entirety of an image to be presented on a display panel.

11. A non-transitory computer-readable medium (CRM) comprising instructions that, when executed by an apparatus, cause the apparatus to:

determine, for a frame comprising a plurality of pixels, an intensity of each one of the plurality of pixels by averaging red, green, and blue channel values of each pixel of the plurality of pixels;

generate a histogram of a distribution of the intensity of the plurality of pixels by binning the intensity for each pixel of the plurality of pixels into one of a plurality of bins, each of the plurality of bins representing a range of intensity values that is a subset of total possible intensity values, such that the histogram is based upon the average of the red, green, and blue channel values per pixel;

determine, from the histogram, a dimming curve to achieve a predetermined dimming target;

smooth, using the histogram, the dimming curve; and adjust, using the dimming curve, the intensity of each of the plurality of pixels in the frame, wherein each range of intensity values for each of the plurality of bins is equal in size.

12. The non-transitory CRM of claim 11, wherein the instructions further cause the apparatus to determine the dimming curve that dims the pixels of the plurality of pixels in bins that represent mid-tones at a first weight, and dims pixels in bins exceeding a predetermined threshold with a linearly decreasing weight.

13. The non-transitory CRM of claim 11, wherein the instructions further cause the apparatus to weight the average to reflect relative power consumptions of red, green, and blue channels corresponding to the red, green, and blue channel values, respectively.

14. The non-transitory CRM of claim 11, wherein the instructions further cause the apparatus to determine the dimming curve that dims pixels with intensities that represent mid-tones in the frame greater than pixels with intensities that represent low tones or high tones.

15. The non-transitory CRM of claim 11, wherein the instructions further cause the apparatus to pass the dimming curve through a windowed smoothing filter.

16. The non-transitory CRM of claim 11, wherein the instructions further cause the apparatus to implement the dimming curve as a look-up table.

17. An apparatus, comprising:

a histogram generator configured to:

determine, for a frame comprising a plurality of pixels, an intensity of each one of the plurality of pixels by averaging subpixel channel values of each pixel of the plurality of pixels;

generate a histogram by placing each pixel of the plurality of pixels into a one of a plurality of bins based upon each pixel's intensity value such that the histogram is based upon the average of the subpixel channel values per pixel, wherein each of the plurality of bins represents a range of intensity values that is a subset of all possible intensity values;

a multiplier calculator configured to determine a dimming curve, the dimming curve weighted to more heavily dim pixels of the plurality of pixels in bins that represent mid tones of the frame over pixels in bins that represent dark tones or light tones of the frame;

a window filter configured to smooth the dimming curve; and a frame transformer configured to adjust the intensity value of each pixel of the frame based on the smoothed dimming curve, wherein each of the plurality of bins is of equal size.

18. The apparatus of claim 17, wherein the subpixel values of each pixel of the plurality of pixels comprise red, green, and blue channel values.

19. The apparatus of claim 17, wherein the dimming curve is represented as a look-up table.

20. A method, comprising:

determining, for a frame comprising a plurality of pixels, an intensity of each one of the plurality of pixels by averaging subpixel channel values of each pixel of the plurality of pixels;

generating a histogram of a distribution of the intensity of the plurality of pixels such that the histogram is based upon the average of the subpixel channel values per pixel;

determining, from the histogram, a dimming curve that preserves image contrast ratio while achieving a predetermined dimming target;

smoothing, using the histogram, the dimming curve;

adjusting, using the dimming curve, the intensity of each of the plurality of pixels in the frame; and capping the dimming curve by imposing a predetermined threshold amount by which the intensity of each pixel of the plurality of pixels may be dimmed, wherein imposing the predetermined threshold amount comprises comparing the dimming curve against a capping curve, and selecting a greater of the dimming amount resulting from the dimming curve or the dimming amount resulting from the capping curve for each point along the dimming curve.

* * * * *